United States Patent
Shin et al.

(10) Patent No.: US 8,253,864 B2
(45) Date of Patent: *Aug. 28, 2012

(54) METHOD OF VIEWING A DATA BROADCAST AND A RECEIVER FOR IMPLEMENTING THE SAME

(75) Inventors: Eun Kyung Shin, Gumi-si (KR); Jae Kyung Lee, Gumi-si (KR)

(73) Assignee: LG Electronics Inc., Seoul (KR)

( * ) Notice: Subject to any disclaimer, the term of this patent is extended or adjusted under 35 U.S.C. 154(b) by 395 days.

This patent is subject to a terminal disclaimer.

(21) Appl. No.: 12/514,123

(22) PCT Filed: Nov. 5, 2007

(86) PCT No.: PCT/KR2007/005551
§ 371 (c)(1),
(2), (4) Date: Feb. 12, 2010

(87) PCT Pub. No.: WO2008/056919
PCT Pub. Date: May 15, 2008

(65) Prior Publication Data
US 2010/0141842 A1    Jun. 10, 2010

(30) Foreign Application Priority Data

Nov. 10, 2006   (KR) .................. 10-2006-0110968

(51) Int. Cl.
*H04N 5/44* (2006.01)
*H04N 5/50* (2006.01)
*H04N 5/445* (2006.01)

(52) U.S. Cl. ......... 348/725; 348/731; 348/569; 348/564

(58) Field of Classification Search .................. 348/731, 348/725, 563, 564, 569, 565; 725/37–40; *H04N 5/50, 5/445, 5/45, 5/44*
See application file for complete search history.

(56) References Cited

U.S. PATENT DOCUMENTS
5,838,384 A * 11/1998 Schindler et al. ............. 348/563
(Continued)

FOREIGN PATENT DOCUMENTS
| CN | 1496181 A | 5/2004 |
| WO | WO 03/098919 | 11/2003 |
| WO | WO 2004/077811 A2 | 9/2004 |

OTHER PUBLICATIONS

European Search Report dated Aug. 30, 2011 issued in Application No. 07 83 3859.

(Continued)

*Primary Examiner* — Sherrie Hsia
(74) *Attorney, Agent, or Firm* — KED & Associates, LLP (57) ABSTRACT

A device for receiving broadcast signal is disclosed. More specifically, the device includes an user interface (132) configured to provide at least one command signal for selecting a data broadcast signal which has been selected by a user and for selecting an audio, a controller (100) configured to provide control signals according to the command signal inputted via the user interface (132), a tuner (102) configured to synchronize at least one transmit stream (TS) of the selected data broadcast channel according to the control signal, a TS unit (104) configured to convert the at least one TS into at least one of a plurality of audible signals for video, a plurality of audible audio signals for data, a plurality of displayable video signals, and a plurality of displayable data signals (200), an audio switch configured to output any one of the plurality of audible audio signals for video or the plurality of audible audio signals for data according to the control signal, a display module (138) configured to display at least one of the video and the data on a same screen, and at least one speaker (137) configured to output audible audio outputted from the audio switch.

11 Claims, 7 Drawing Sheets

U.S. PATENT DOCUMENTS

| | | | |
|---|---|---|---|
| 5,892,535 A | 4/1999 | Allen et al. ................ | 348/9 |
| 6,209,028 B1 | 3/2001 | Walker et al. ............. | 709/219 |
| 2003/0023985 A1 | 1/2003 | Rhee ......................... | 725/131 |
| 2004/0047590 A1 | 3/2004 | Matsuo | |
| 2005/0105894 A1 | 5/2005 | Jung et al. ................. | 386/96 |
| 2006/0026640 A1 | 2/2006 | Pocock ...................... | 725/39 |
| 2006/0152628 A1 | 7/2006 | Park et al. ................. | 348/565 |

OTHER PUBLICATIONS

Chinese Office Action dated Apr. 8, 2010 for Application No. 200780041715.X.

International Search Report dated Mar. 20, 2008.

\* cited by examiner

PRIOR ART

FIG. 1

PRIOR ART

FIG. 2

PRIOR ART

METHOD OF VIEWING A DATA BROADCAST AND A RECEIVER FOR IMPLEMENTING THE SAME

TECHNICAL FIELD

The present invention relates to method of viewing a data broadcast, and more particularly, to method of viewing a data broadcast and a receiver for implementing the same.

BACKGROUND ART

With widespread use and increasing popularity of digital broadcast services, a multi-mode system has been receiving much attention as of late. The multi-mode system allows a user to view broadcast signals of multiple channels via a single digital television broadcast channel.

Compared to conventional broadcast methods through which only video and audio signals are broadcasted, the current or future broadcast systems can include data signal in its broadcast in addition to the video and audio signals. In such systems, receivers are equipped with features and functions to accommodate the changing broadcast systems efficiently and effectively.

Generally, transport stream (TS) for broadcasting of contents are categorized into three (3) types—video signal, audio signal, and data broadcast signal.

According to the conventional system, if the user (or a viewer) selects a data broadcast function via a user interface while viewing a broadcast channel, the video and audio corresponding to the selected broadcast (e.g., news, drama) is displayed and outputted, respectively. Moreover, the data broadcast is displayed on the same screen at the same time with the video.

The conventional receiver lacked the function of receiving the data broadcast (or data broadcast signals), and as a result, the data broadcast was received with an aid of an external set top box. In displaying the data broadcast, the video (displayed in "$1^{st}$ display area") corresponding to the broadcast of the data broadcast channel is displayed along with the data (displayed in "2nd display area") corresponding to the same broadcast channel.

Figure 1:
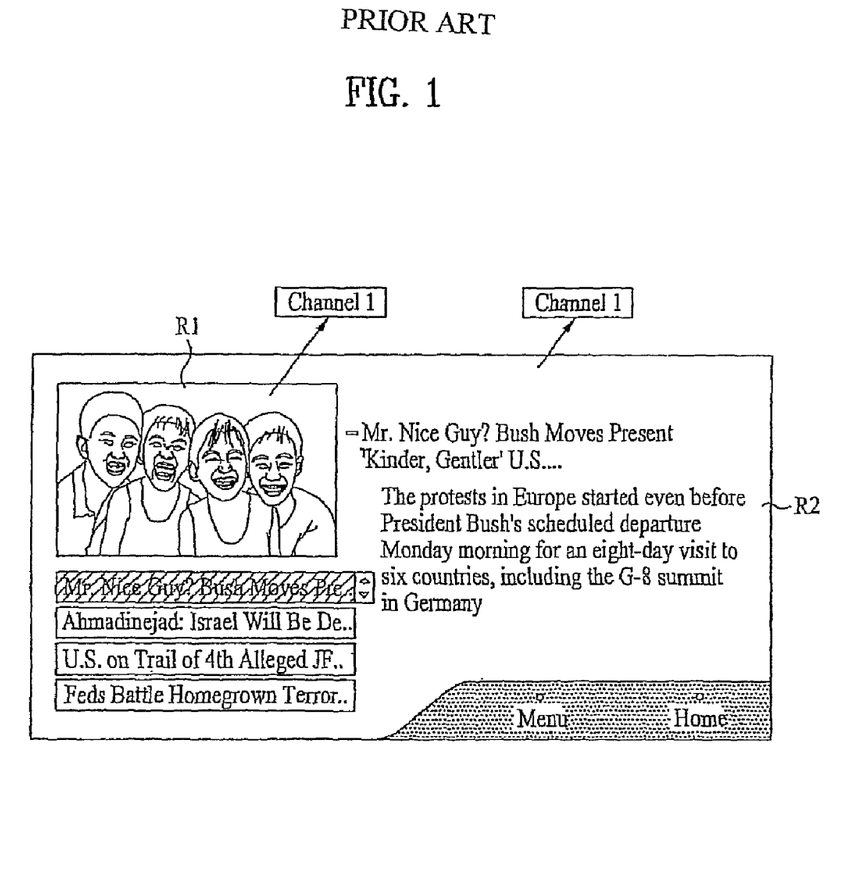
FIG. 1 is an exemplary diagram displaying video and data of a particular broadcast channel on a same screen.

FIG. 1 is an exemplary diagram displaying video and data broadcast of a particular broadcast channel on a same screen. Referring to FIG. 1, R1 illustrates a region in which video associated with the particular broadcast channel (e.g., EBS broadcast channel) is displayed, and R2 illustrates a region in which data broadcast associated with EBS broadcast channel is displayed.

Figure 2:
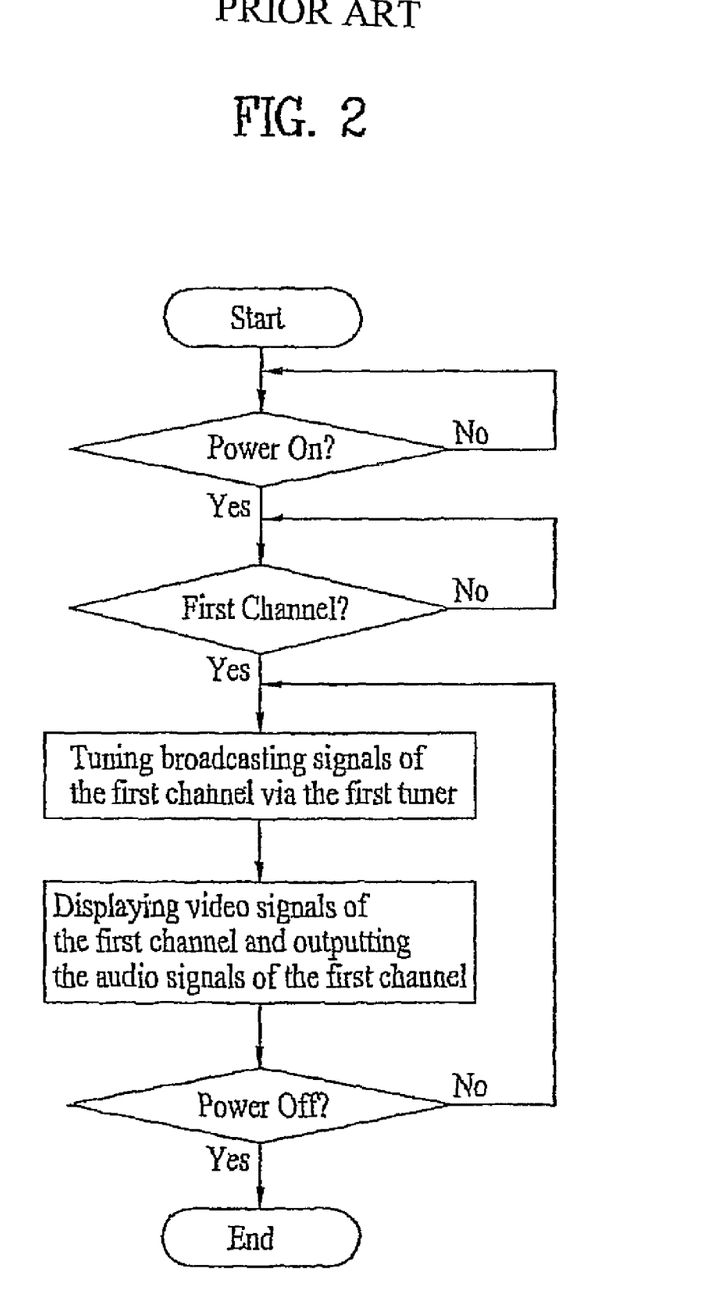
FIG. 2 is an exemplary flowchart illustrating the processes associated with watching or viewing a broadcast channel.
Figure 3:
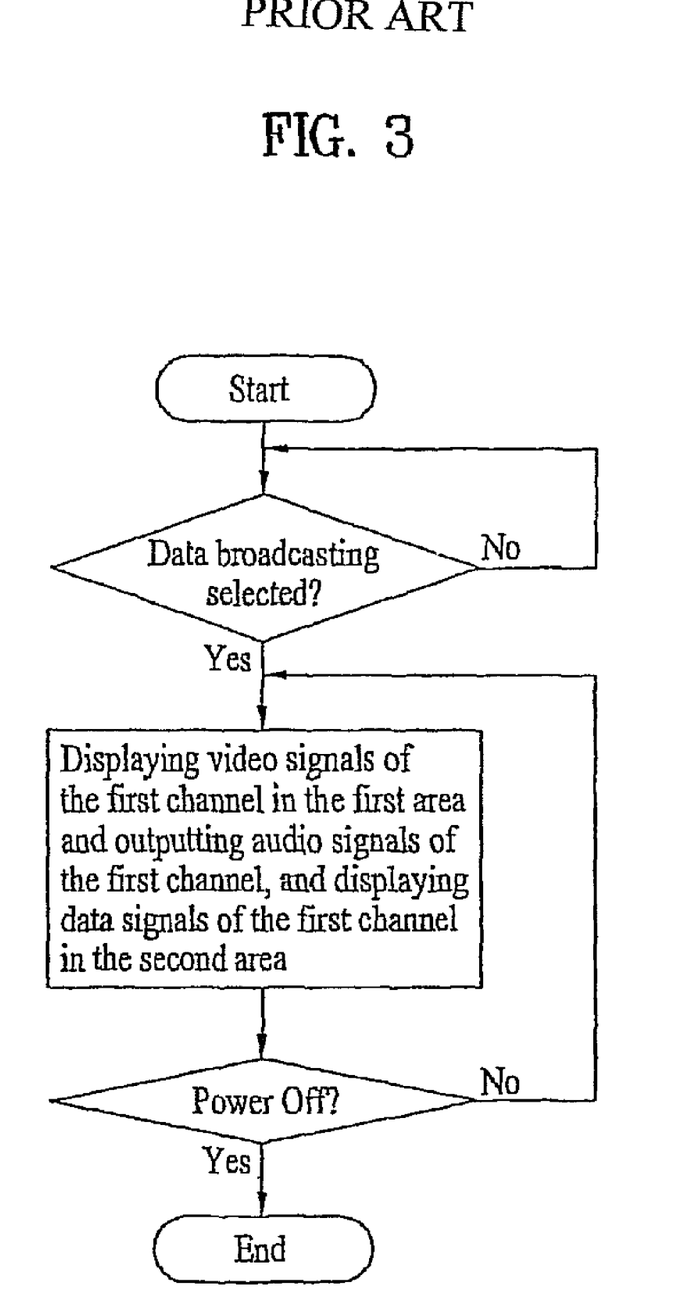
FIG. 3 is another exemplary flowchart illustrating the processes associated with watching or viewing a broadcast channel.

FIG. 2 and FIG. 3 are exemplary flowcharts illustrating the processes associated with watching or viewing a broadcast channel. Referring to FIG. 2, after a receiver's power is turned on, a controller determines whether a first (or $1^{st}$) channel has been selected by a user via a user interface. If it is determined that the first channel has been selected, the controller synchronizes the broadcast signal corresponding to the first channel via a tuner.

Thereafter, the controller sends a control signal to the display module to display the video of the first channel on the entire screen, and at the same time, sends a control signal to the at least one speaker to output audio of the first channel. Here, the video and audio are displayed and outputted, respectively, until the power of the receiver is turned off.

Referring to FIG. 3, while the video of the first channel is displayed on the entire screen and the audio of the first channel is outputted via the speaker(s), the controller determines whether a data broadcast key (or button) has been selected on the user interface by the user. If it is determined that the data broadcast key has been selected, the controller displays the video on a first display area of the screen or R1 with respect to FIG. 1. During this time, the audio is continually outputted via the speaker(s). As for the selected data broadcast, the data broadcast of the first channel is then displayed on a second display area (or a different part) of the screen or R2 with respect to FIG. 1. Here, the video and data are displayed in the first display area (e.g., R1) and the second display area (e.g., R2), respectively, until the power of the receiver is turned off.

The user interface, as discussed above, can be a remote controller and/or a compilation of keys/buttons on the receiver.

DISCLOSURE OF THE INVENTION

Technical Problem

The problems associated with the conventional data broadcast are as follows. First, when the user is viewing the video and data of the first broadcast channel, the audio corresponds to the video of the first channel. In other words, the data and the audio do not necessarily correspond to each other.

Second, when a particular broadcast channel is being viewed, the video, audio, and data are of the particular broadcast channel. That is, the video and the data cannot be independently viewed.

Technical Solution

Accordingly, the present invention is directed to method of viewing a data broadcast and a receiver for implementing the same that substantially obviates one or more problems due to limitations and disadvantages of the related art.

An object of the present invention is to provide a device for receiving broadcast signal.

Another object of the present invention is to provide a method of displaying data broadcast via a receiver.

A further object of the present invention is to provide a method of displaying data via a receiving device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, device for receiving broadcast signal includes an user interface configured to provide at least one command signal for selecting a data broadcast signal which has been selected by a user and for selecting an audio, a controller configured to provide control signals according to the command signal inputted via the user interface, a tuner configured to synchronize at least one transmit stream (TS) of the selected data broadcast channel according to the control signal, a TS unit configured to convert the at least one TS into at least one of a plurality of audible audio signals for video, a plurality of audible audio signals for data, a plurality of displayable video signals, and a plurality of displayable data signals, an audio switch configured to output any one of the plurality of audible audio signals for video or the plurality of audible audio signals for data according to the control signal, a display module configured to display at least one of the video and the data on a same screen, and at least one speaker configured to output audible audio outputted from the audio switch.

In another aspect of the present invention, a method of displaying data broadcast via a receiver includes synchronizing by a tuner at least one transmit stream (TS) of the selected channel, converting the at least one TS into audible audio, displayable video, and displayable data, and displaying the displayable video and the displayable data on a same screen and outputting via at least one speaker the audible audio for the video or the data based on a user's selection.

In a further aspect of the present invention, a method of display data broadcast via a receiver includes providing at least one command signal for selecting a data broadcast signal which has been selected by a user and for selecting an audio, providing control signals according to the command signal, synchronizing at least one transmit stream (TS) of the selected data broadcast channel according to the control signal, converting the at least one TS into at least one of a plurality of audible audio signals for video, a plurality of audible audio signals for data, a plurality of displayable video signals, and a plurality of displayable data signals, outputting any one of the plurality of audible audio signals for video or the plurality of audible audio signals for data according to the control signal, displaying at least one of the video and the data on a same screen, and outputting audible audio to at least one speaker.

Yet, in another aspect of the present invention, a method of displaying data via a receiving device includes displaying on a screen video associated with the first channel which is selected by a user, determining whether a data broadcast is selected while viewing the video associated with the first channel, if the data broadcast is selected, determining whether audio is selected to correspond to the video associated with the first channel or to the selected data broadcast, displaying in a first display area of the screen the video associated with the first channel and in a second display area of the screen the selected data broadcast, and outputting an audio for any one of the video associated with the first channel or of the selected data broadcast.

It is to be understood that both the foregoing general description and the following detailed description of the present invention are exemplary and explanatory and are intended to provide further explanation of the invention as claimed.

DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, data broadcast (or data broadcast signal), other than the video and audio (or video/audio signals), will be referred to as data (or data signal).

Figure 4:
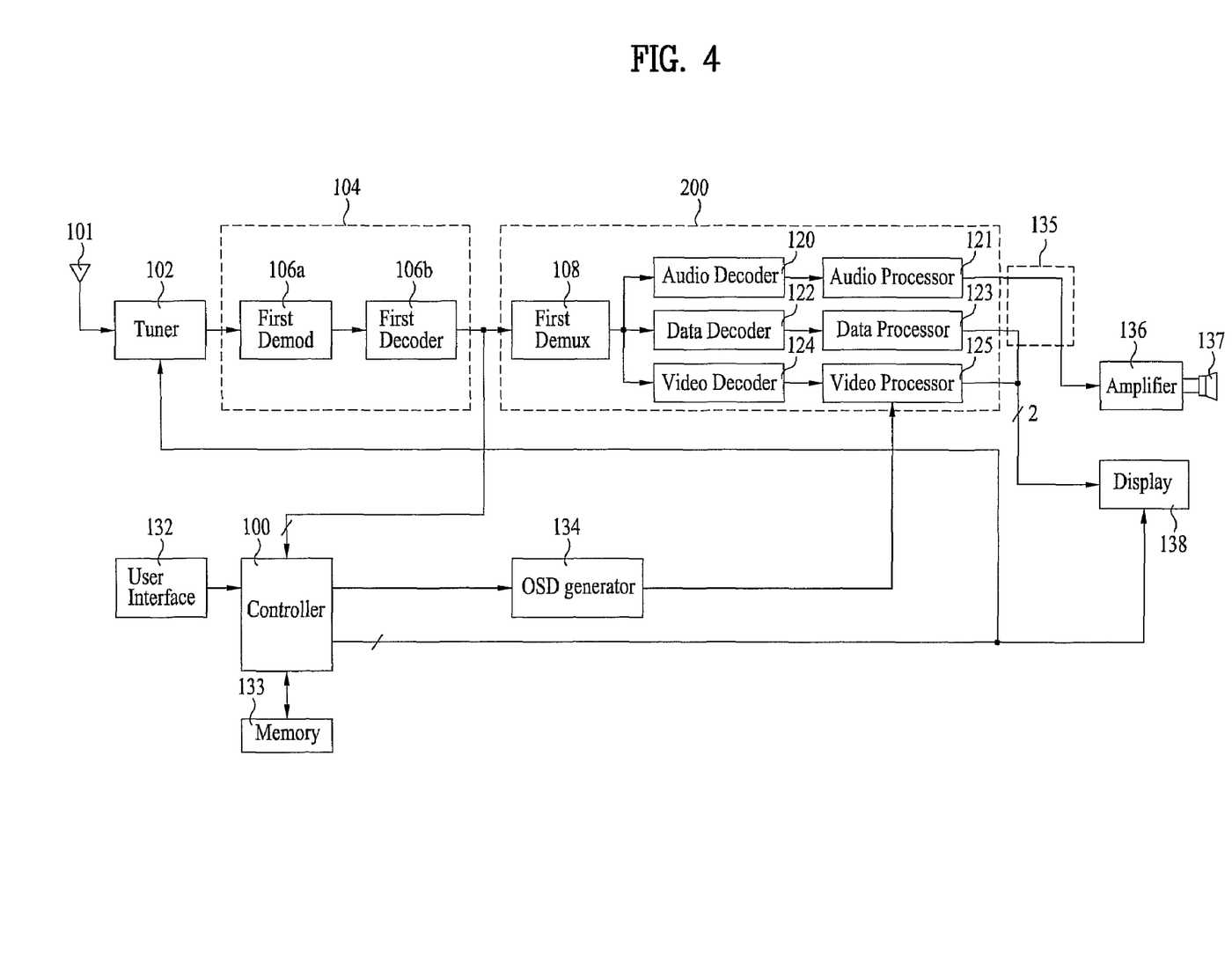
FIG. 4 is an exemplary diagram illustrating a receiver (or a television broadcast receiver) according to an embodiment of the present invention.

FIG. 4 is an exemplary diagram illustrating a receiver (or a television broadcast receiver) according to an embodiment of the present invention. Referring to FIG. 4, the receiver or the television broadcast receiver comprises a controller 100, a memory 133, a user interface 132, an on screen display (OSD) generator 134, an antenna 101, a tuner 102, a digital broadcast processing unit 104, a broadcast signal output unit 200, an audio switch 135, an amplifier 136, a speaker 137, and a display module 138.

More specifically, the OSD generator 134 can be configured to generate data under the control of the controller 100, the antenna (or antennas) 101 can be configured to receive broadcast signals, and the tuner 102 can be configured to tune (or synchronize) the broadcast signals for viewing. In addition, the digital broadcast processing unit 104 can be configured to process a transport stream outputted from the tuner 102. Thereafter, the broadcast signal output unit 200 can be configured to separate the output signals from the digital broadcast processing unit 104 into the video stream (or signals), data stream, and audio stream for video or data and then convert the streams (or signals) into a displayable video, audio, and data signals. The audio switch 135 can be configured to selectively output any one of the audio for the video or the audio for the data outputted from the broadcast signal output unit 200. Then, the selectively outputted audio can be amplified by the amplifier 136, and then the speaker (or speakers) 137 can be configured to output the amplified audio signal as audible audio signal. Lastly, the display module 138 can be configured to display the video and/or data outputted from the broadcast signal output unit 200 on a screen.

Here, the number of units of the receiver (e.g., tuner, speaker, and antenna) is not limited to a single unit but can be configured by a plurality of units. For example, the tuner 102 is not limited to a single tuner, but the receiver can be comprised of more than one tuner.

Although the discussions as related to the embodiments of the present invention relate to a receiver or a television broadcast receiver, the discussions are not limited to the aforementioned types of receivers but can be further applied to different types of receivers, such as a set-top box.

The controller 100 can be configured to control the general/overall operations of the receiver (or the television broadcast receiver). In particular, the controller 100 can be configured to allow operation of the tuner 102 to synchronize the broadcast signal of the desired channel according to the data broadcast channel selection. Moreover, the controller 100 can be configured to provide a switching control signal to allow selection of either the audio for the video or the audio for the data based on the user selection.

In addition, the controller 100 can be configured to have the OSD generator 134 generate data for the OSD (also referred to as "OSD data") corresponding to the selection made by the user. For example, the controller 100 can control the OSD generator 134 to generate OSD data in form of a list. The list can comprise a plurality of selectable items for a user to choose, via a user interface (e.g., remote controller, menu keys, or buttons on the receiver), any one of audio for the video or audio for the data.

The generated OSD data can then be processed by a video processor 125 and combined with the video. The combined video and data are then sent to the display module 138 to be displayed on the screen. At this point, the display module 138 can be configured to display the list so as to allow the user to make a selection. The user can then select any one of the two selectable items (e.g., audio for video or audio for data) using the user interface 132.

The memory 133 can be configured to store various information including system program of the controller 100. More specifically, the memory 133 can be configured to store a channel list. Here, the channel list can include channels which provide updated data broadcast. The memory 133 can further be configured to send the stored channel list to the display module 138 upon request/command from the controller 100.

The user interface 132 can be configured to provide various commands/signals inputted via devices or means, such as a remote controller or a keypad, to the controller 100. As discussed, the OSD generator 134 can be configured to generate OSD data and send the generated OSD data to the broadcast signal output unit 200.

The tuner 102 can be configured to tune (or synchronize) a broadcast channel from multiple broadcast signals received in TS form, and the TS of the tuned broadcast channel can then be provided to a corresponding digital broadcast signal processor 104.

The digital broadcast signal processor 104 can be configured to include a demodulator 106a and a decoder 106b. The demodulator 106a can be configured to demodulate the TS provided by the tuner 102, and the decoder 106b can be configured to decode and convert the demodulated TS into a video stream, an audio stream, and a data stream before providing the converted streams to the broadcast signal output unit 200.

The broadcast signal output unit 200 comprises a first demultiplexer 108, an audio decoder 120, an audio processor 121, a data decoder 122, a data processor 123, a video decoder 124, and a video processor 125.

In detail, the demultiplexer 108 can be configured to separate (or demultiplex) the audio, video, and data streams (or signals) outputted from the digital broadcast signal processor 104. The audio decoder 120 can be configured to decode the audio stream (or signals) demultiplexed by the demultiplexer 108. The decoded audio signal can then be converted into audible audio signal by the audio processor 121.

In addition, the data decoder 122 can be configured to decode the data stream (or signals) demultiplexed by the demultiplexer 108. The data processor 123 can then be configured to decode the decoded data signal into a data that can be displayed. Lastly, the video decoder 124 can be configured to decode the video stream (or signals) demultiplexed by the demultiplexer 108. The decoded video signal can then be converted into video signal that can be displayed by the video processor 125.

The OSD generator 134 can be configured to provide the generated OSD data to the video processor 125 of the broadcast signal output unit 200 so that the provided OSD data can be combined with each video and displayed on the screen. At this stage, if the user chooses to view a selection list (or menu) for selecting any one of the audio for video or audio for data, the OSD generation 134 can generate a selectable OSD data and send to the video processor 125. In other words, the user can select the audio for video or the audio for data directly from the user interface or from the OSD generated selection list (or menu).

The display module 138 can be configured to include a liquid crystal display (LCD) module, a plasma display panel (PDP) module, a cathode ray tube (CRT) module, an organic light emitting display (OLED), and a light emitting display (LED), among other modules.

In the discussion above, there are two (2) digital broadcast signal processors and two (2) broadcast signal output units. However, if there are more than two (2) tuners, the number of the digital broadcast signal processors and of the broadcast signal output units can correspond with the number of the tuners. Moreover, if there are more than two (2) tuners, it is possible to display more than two (2) picture-in-picture (PIP) on the screen according to the changes to the system program of the television broadcast receiver.

Figure 5:
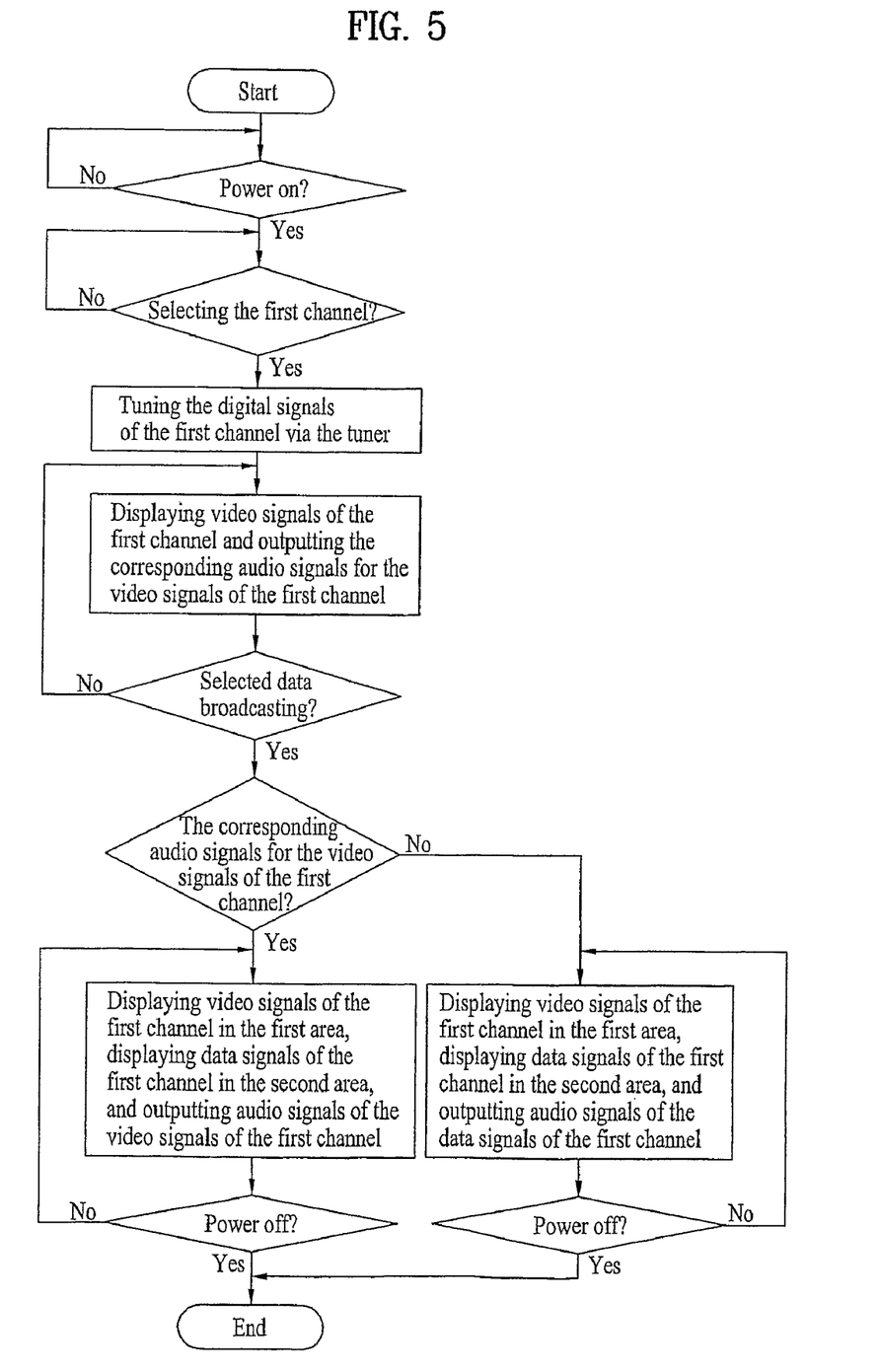
FIG. 5. is an exemplary flowchart illustrating a broadcast signal process
Figure 6A:
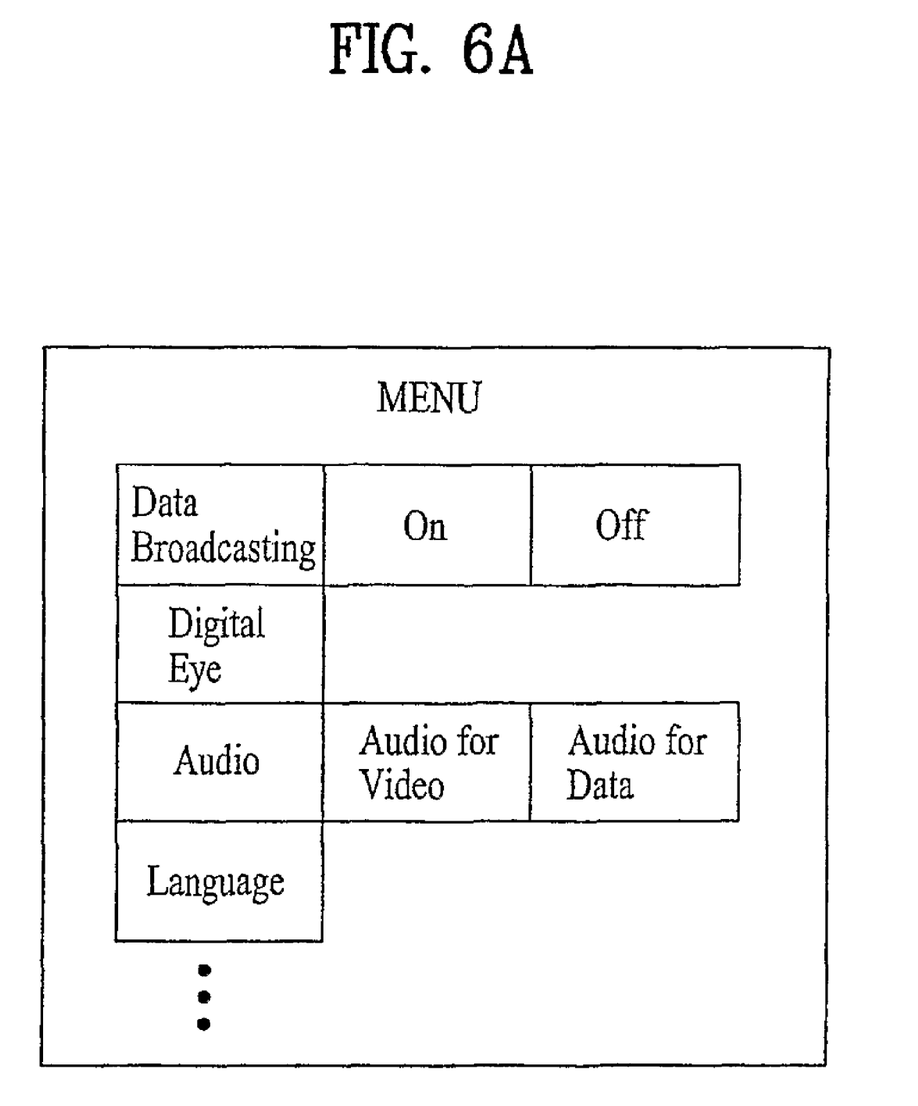
FIG. 6A is an exemplary diagram illustrating selection of the audio for data on the OSD menu screen.
Figure 6B:
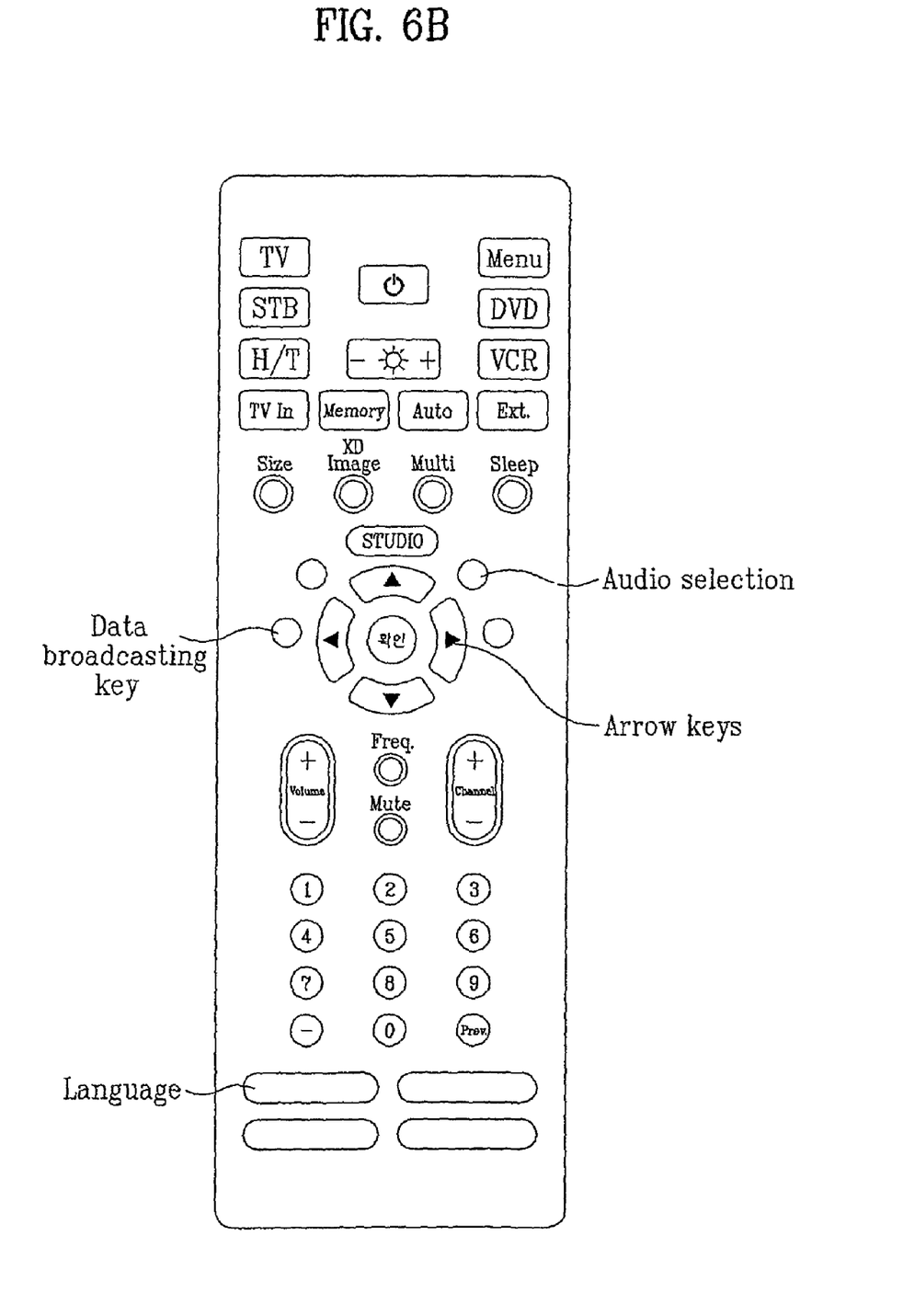
FIG. 6B is an exemplary diagram illustrating a remote controller with a button/key for selecting the audio for data.

FIG. 5 is an exemplary flowchart illustrating a broadcast signal process. FIG. 6A is an exemplary diagram illustrating selection of the audio for data on the OSD menu screen. FIG. 6B is an exemplary diagram illustrating a remote controller with a button/key for selecting the audio for data.

Referring to FIG. 5, after the user turns on the power, the controller 100 can determine whether a first channel has been selected by the user via the user interface 132. If it is determined that the user has selected the first channel, the controller 100 can synchronize the broadcast signal corresponding to the selected first channel through the tuner 102. Thereafter, the controller 100 can display the video of the first channel on the entire screen of the display module 138 and can output the audio associated with the first channel via the speaker 137.

At this time, if the user chooses to view the data broadcast of the first channel via the user interface 132 or the OSD menu feature, the controller 100 determines which of the audio for the video or the audio for the data has been selected by the user. If the audio for the video of the first channel is selected, then the controller 100 sends the signal to display the video of the first channel in a first display area of the screen and to display the data of the first channel in a second display area of the screen. Here, the first display area and the second display area refer to different regions of the screen. For example, the left side of the screen can be dedicated to the first display area while the right side (or the remaining area) can be dedicated to the second display area. It is, however, possible for the display areas to partially overlap each other.

While the video and data are being displayed on respective areas of the screen, the audio for the video is outputted via the speaker(s) 137. As discussed, the user can select any one of the audio for the video or the audio for the data using the user interface 132 or a remote controller.

Referring to FIG. 6A, the menu can be displayed on the screen by the user selecting a menu key on the user interface 132 (e.g., buttons/keys on the receiver or on the remote controller). The menu can provide selections for data broadcast, digital eye, audio, and language caption. However, these selection items are not limited to the aforementioned but can be configured differently by the manufacturer of the receiver.

In FIG. 6A, if the user selects the audio item from the menu, the user is given a further selection option to choose either an audio for video or audio for data. If the user selects the audio for the data, the speaker outputs the audio associated with the data.

Alternatively, if the user selects the data broadcast item form the menu, the user is given another selection option to choose either 'on' or 'off.' At this time, if the user selects 'on,' the data broadcast is selected.

As discussed above, as shown in FIG. 6B, an independent button/key can be provided on the user interface for selecting audio. Here, if the user presses once the audio button/key on the user interface 132, the audio for the data can be outputted via the speaker(s) 137. Moreover, if the user audio button/key on the user interface 132 is pressed once more (total of twice in this example), then the audio for the video can be outputted via the speaker(s) 137. Similarly, buttons/keys for the other items of the menu (e.g., data broadcast) can be provided on the user interface 132 and can function in the similar/same manner.

The remote controller as illustrated in FIG. 6B, comprises a power button, a menu button, 4-direction buttons, an audio selection button, channel up/down buttons, volume up/down buttons, numerical buttons, a language caption selection button, a television function selection button, and an external device selection button. Here, the term 'button' can be interchangeably used with a term 'key.' The functions associated with the buttons can be preconfigured by the manufacturer.

As discussed, the data broadcast can be selected from the OSD menu provided on the screen and/or from the user interface 132 via the configured buttons/keys. If the audio for the video of the first channel is selected by the user, the controller 100 can provide switching control signal to the audio switch 135 to send signal to the audio processor 121 to output the audio for the video.

That is, when the audio for the video is being outputted via the speaker(s) 137, the video of the first channel is being displayed on a first display area of the screen and the data of the first channel is being displayed on a second display area of the screen.

Alternatively, if the audio for the data is outputted as a result of user selection on the user interface 132, the controller 100 sends signal for outputting the audio associated with the data to the audio switch 135. That is, when the audio for the data is being outputted via the speaker(s) 137, the video of the first channel is being displayed on a first display area of the screen and the data of the first channel is being displayed on a second display area of the screen. Lastly, the video and audio can be continually displayed and outputted, respectively, until the power of the receiver is turned off.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A device for receiving broadcast signal, comprising:
a user interface configured to provide at least one command signal for selecting either data broadcasting mode-on or data broadcast mode-off, and for selecting either an audio mode for video or an audio mode for data broadcast;
a controller configured to provide control signals according to the command signal inputted via the user interface;
a tuner configured to synchronize at least one transport stream (TS) of the selected data broadcast channel according to at least one of the control signals;
a TS unit configured to convert the at least one TS into at least one of a plurality of audible audio signals for video, a plurality of audible audio signals for data broadcast, a plurality of displayable video signals, and a plurality of displayable data signals;
an audio switch configured to output either the plurality of audible audio signals for video or the plurality of audible audio signals for data broadcast according to at least one of the control signals, wherein the data broadcast is independent of the video;
a display module configured to display at least one of the video and the data broadcast on a same screen; and
at least one speaker configured to output audible audio outputted from the audio switch.

2. The device of claim 1, further comprising an on screen display (OSD) generator configured to generate OSD data in a form of a menu.

3. The device of claim 1, wherein the TS unit includes a broadcast signal output unit that is configured to convert and output a video stream and a data stream into a displayable video and data.

4. The device of claim 3, wherein the broadcast signal output unit includes:
a digital broadcast signal unit configured to convert the TS outputted from the tuner into the video stream, the data stream, and an audio stream; and
an audio unit configured to convert and output the audio stream into an audio signal for the video and for the data.

5. The device of claim 3, wherein the broadcast signal output unit includes:
an audio decoder for decoding the audio stream;
a data decoder for decoding the data stream;
a video decoder for decoding the video stream;
an audio processor for converting the decoded audio stream into audible audio;
a data processor for converting the decoded data stream into a displayable data; and
a video processor for converting the decoded video stream into a displayable video.

6. A method of displaying data via a receiving device, the method comprising:
displaying on a screen video associated with a first channel that is selected by a user;
determining whether a data broadcast is selected while viewing the video associated with the first channel;
when the data broadcast is selected, determining whether audio is selected to correspond to the video associated with the first channel or to correspond to the selected data broadcast;
displaying, in a first display area of the screen, the video associated with the first channel and in a second display area of the screen the selected data broadcast when the data broadcast is selected; and
outputting an audio for either the video associated with the first channel or the selected data broadcast depending on the audio selection process when the data broadcast is selected, wherein the data broadcast is independent of the video associated with the first channel.

7. The method of claim 6, wherein the data broadcast is selected via at least one of a user interface and an on-screen display menu.

8. The method of claim 6, wherein the first display area and the second display area are non-overlapping on the screen.

9. The method of claim 6, wherein the first display area and the second display area are partially overlapping on the screen.

10. The method of claim 6, further comprising:
synchronizing broadcast signal corresponding to the first channel; and
displaying the video associated with the first channel on the screen.

11. The method of claim 6, wherein the receiving device is a television broadcast receiver.

* * * * *